Feb. 15, 1949.  T. E. WEAVER  2,461,792
EYEGLASS CASE WITH SIGHT OPENINGS
Filed Nov. 29, 1946
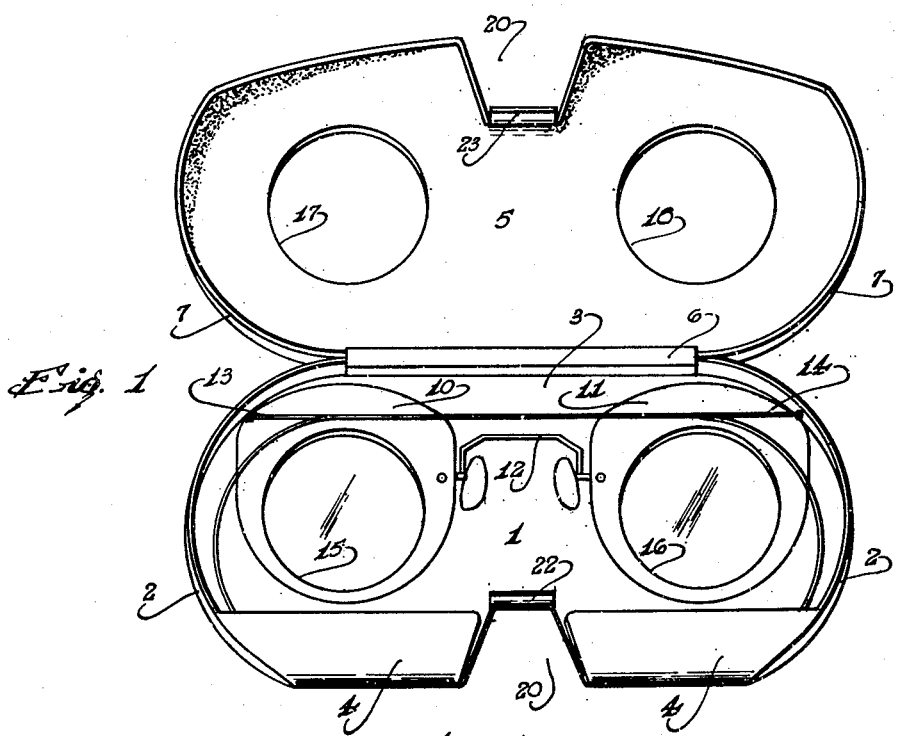
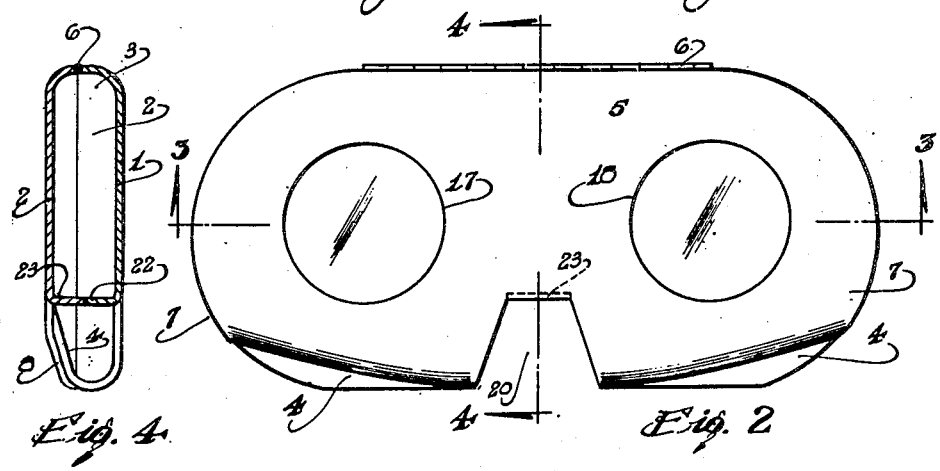
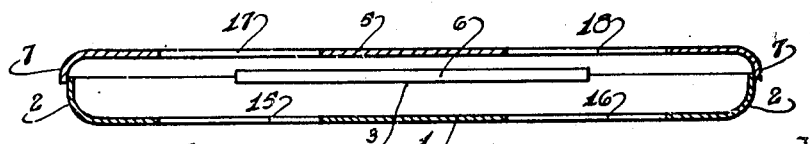
Inventor
Thomas E. Weaver Patented Feb. 15, 1949

2,461,792

UNITED STATES PATENT OFFICE 2,461,792

EYEGLASS CASE WITH SIGHT OPENINGS

Thomas E. Weaver, Chicago, Ill.

Application November 29, 1946, Serial No. 712,791

5 Claims. (Cl. 88—41)

My present invention has for its object to improve cases for eyeglasses and spectacles by providing one in which the back and cover portions are provided with an opening or openings in the area of the lenses of the enclosed eyeglasses which will enable the user to view objects therethrough without removing the eyeglasses from the case.

Another object of my invention is to provide a case especially adapted for the protection of spectacles having ample provision for the spectacle temple pieces, or bows, in which sighting apertures are provided in the walls thereof in alinement with one or both of the lenses and in which an edge of the case is provided with a notched portion for the accommodation of the bridge of a person's nose when the case is held in front of a person's eyes.

To these and other ends my invention embodies further improvements all of which will be fully described in the accompanying specification, the novel features thereof being set forth in the appended claims.

In the drawings:

Figure 1 is a view of an eyeglass case embodying my invention, the parts being shown in the open position and a pair of spectacles lying therein.

Figure 2 is a front view of the case as it appears with the cover closed.

Figure 3 is a longitudinal sectional view of the case taken on the line 3x—3x of Fig. 2, and, Figure 4 is a cross sectional view taken on the line 4x—4x of Fig. 2.

Similar reference characters in the several figures indicate similar parts.

At the present time users of eyeglasses and especially those persons who are not required to wear their glasses continuously, or use them only for close work, such as reading, find themselves handicapped when it becomes necessary to scrutinize printed matter on occasion when a temporary glance is sufficient. To avoid, therefore, the necessity of opening the case, removing the glasses, adjusting them in reading position and thereafter returning them to the case, I provide a case which may be held in front of a person's eyes, and through which he may view objects and obtain the ocular benefits of the enclosed lenses, the case itself serving as a support or handle while held in the fingers of one hand.

Illustrative of my invention I have shown a suitable case or holder comprising the back or receptacle portion and a cover, said parts being preferably made of light metal or similar stiff material and hinged together at one edge.

The receptacle portion comprises a back panel 1 the ends and rear edge of which are rounded, as indicated at 2 and 3, respectively, to provide the required depth, while its forward edge has a curved lip 4 which extends over the panel 1 in spaced relation thereto to provide a pocket for the edges of the lenses of eyeglasses and for the ends of the bows of the temples of spectacles, as shown in Fig. 1.

The cover likewise comprises a panel 5 which when it is closed on the hinge 6, lies parallel to the panel 1 although parallelism of these panels is not essential nor is the configuration of the cover important. However, in the drawings I have shown the cover as having inwardly curved ends 7 which slightly overlap the ends 2 of the receptacle, as shown in Fig. 3, and a slightly offset lip 8 at its forward edge which closes against the counterpart 4, as shown in Fig. 4. The parts described are to be covered exteriorly with a suitable facing, such as imitation leather and interiorly they are faced with a soft finished material such as plush or velvet, as will be understood.

In Fig. 1 I have shown a pair of spectacles comprising the lenses 10 and 11 connected by the usual bridge 12 and having the temples 13 and 14 which are in folded position with the ends of their bows tucked within the pocket formed by the lip 4.

Within the areas occupied by the lenses of the eyeglasses or spectacles I provide each of the panels 1 and 5 with registering apertures, those in panel 1 being indicated as 15 and 16 and those in panel 5 of the cover being indicated by 17—18. If desired these four openings may be covered with transparent material preferably thin sheets of one of the known present day plastic compositions.

It will be seen from the construction described that by merely holding the case in the line of vision at approximately the proper focal point any object may be readily viewed without removing the eyeglasses from the case.

In furtherance of the use of the case with the enclosed lenses I provide both parts of the case with a centrally located notch 20 of ample dimensions to fit over the bridge of a person's nose. This notch extends across the pocket formed by the lip 4 and in forming it I cut the panel 1 so as to leave triangular portions, which may be folded outwardly to close the proximate ends of the pocket formed by the lip 4. At the inner end or bottom of the notch I also form a flange 22 which is approximately one-half the width of the pocket and is turned inwardly. On the cover panel 5 I also form an inwardly extending flange 23 which is located in alinement with the flange 22. The meeting of these two flanges, well within the periphery of the eyeglass case and midway between its ends, adds greatly to the resistance of the panels against a force tending to crush the case.

It will be appreciated from the foregoing that I have provided an eyeglass case which is serviceable to persons for emergency use in any situation where casual observation of an object or printed matter may be all that is desired, much in the manner in which lorgnettes are employed. Herein it is intended that the term eyeglasses is to be considered generic and cover all mountings of lenses either of the pince-nez type or of spectacle form. While I have illustrated a case having sighting apertures in its opposite sides in alinement with the usual two eye lenses it will be understood that my invention may be accomplished in which the viewing apertures are alined with a single lens.

I claim:

1. An eyeglass case comprising a back portion forming a receptacle for a pair of eyeglasses having a bottom and a cover for closing the receptacle, said cover and receptacle bottom being each of opaque material and having openings affording a view through the case in the areas occupied by the lenses of said eyeglasses.

2. An eyeglass case comprising a back portion forming a receptacle for a pair of eyeglasses having a bottom, and a cover for the receptacle hinged thereto at one side, said cover and receptacle having openings affording a view through the case and provided at their free edges with a notch for the accommodation of the bridge of a person's nose.

3. An eyeglass case comprising a shallow elongated receptacle having a bottom for the reception of a pair of eyeglasses and a cover hinged to one edge of the receptacle, the latter and said cover being each notched at the mid point of their opposite free edges, said receptacle and cover being provided with apertures affording a view through the closed case in the areas of the lenses of the enclosed eyeglasses.

4. An elongated shallow receptacle adapted for the reception of a pair of eyeglasses having a bottom provided with apertures underlying the eyeglass lenses and provided at one edge with an inwardly extending notch located between said lenses, a cover for the receptacle hingedly connected to its other edge, and having a corresponding notch in its free edge and provided with apertures overlying the eyeglass lenses.

5. An elongated shallow receptacle adapted for the reception of a pair of eyeglasses having a bottom provided with apertures underlying the eyeglass lenses and provided at one edge with an inwardly extending notch located between said lenses, a cover for the receptacle hingedly connected to its other edge and having a corresponding notch in its free edge and provided with apertures overlying the eyeglass lenses, and inwardly extending flanges on the receptacle bottom and the cover at the bases of their respective notches which are adapted to engage when said parts are closed together.

THOMAS E. WEAVER.

REFERENCES CITED

The following references are of record in the file of this patent:

UNITED STATES PATENTS

| Number | Name | Date |
| --- | --- | --- |
| 586,816 | Hammer | July 20, 1897 |
| 1,350,294 | Brown et al. | Aug. 24, 1920 |
| 1,902,167 | Hassell et al. | Mar. 21, 1933 |
| 2,058,969 | Fishman | Oct. 27, 1936 |
| 2,125,856 | De Witt | Aug. 2, 1938 |
| 2,162,222 | Lachter | June 13, 1939 |
| 2,166,110 | Baldanza | July 18, 1939 |
| 2,169,075 | Shyer | Aug. 8, 1939 |
| 2,288,255 | Ross | June 30, 1942 |
| 2,372,479 | French | Mar. 27, 1945 |
| 2,389,312 | Honza | Nov. 20, 1945 |

FOREIGN PATENTS

| Number | Country | Date |
| --- | --- | --- |
| 14,663 | Great Britain | 1898 |
| 500,827 | Great Britain | Feb. 16, 1939 |